(12) United States Patent
Chong et al.

(10) Patent No.: US 7,324,290 B2
(45) Date of Patent: Jan. 29, 2008

(54) VARIABLE FOCUS OPTIC MODULE AND OPTIC SYSTEM

(75) Inventors: Seng Chuen Chong, Perak (MY); Thineshwaran Gopal Krishnan, Penang (MY)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/939,259

(22) Filed: Sep. 10, 2004

(65) Prior Publication Data

US 2006/0056058 A1    Mar. 16, 2006

(51) Int. Cl.
*G02B 15/14* (2006.01)
(52) U.S. Cl. ...................... 359/694; 359/699
(58) Field of Classification Search ............... 359/694, 359/699, 703, 704, 819, 822, 823
See application file for complete search history.

(56) References Cited

U.S. PATENT DOCUMENTS

| | | | | | |
|---|---|---|---|---|---|
| 5,268,794 | A | * | 12/1993 | Chan | 359/699 |
| 5,764,312 | A | * | 6/1998 | Okumura | 348/785 |
| 5,831,777 | A | * | 11/1998 | Iwasa | 359/826 |
| 6,115,197 | A | * | 9/2000 | Funahashi | 359/826 |
| 6,396,644 | B2 | * | 5/2002 | Hayashi et al. | 359/699 |
| 6,765,728 | B2 | * | 7/2004 | Kabe | 359/699 |

* cited by examiner

*Primary Examiner*—Ricky Mack
*Assistant Examiner*—M. Hasan
(74) *Attorney, Agent, or Firm*—RatnerPrestia

(57) ABSTRACT

A variable focus optic module is provided with a housing, a lens assembly, and a protrusion and recess system. The lens assembly is movably disposed in operable relationship with the housing. The protrusion and recess system includes at least one protrusion disposed on one of the housing and the lens assembly, and at least one recess disposed in the opposing one of the lens assembly and the housing. The at least one protrusion operatively engages the at least one recess to control axial movement of the lens assembly, in discrete steps relative to the housing.

19 Claims, 3 Drawing Sheets

VARIABLE FOCUS OPTIC MODULE AND OPTIC SYSTEM

BACKGROUND

An optic system such as a camera comprises a lens and an image receiver. The focal length of the lens, together with the distance between the lens and image receiver, determine the distance that a user must position the lens from an object in order to obtain a focused reproduction of the object at the image receiver.

In some optics systems, the distance between the lens and image receiver is fixed. In other optics systems, the distance between the lens and image receiver may be varied, thereby providing the optic system with a variable focusing system.

SUMMARY OF THE INVENTION

In one embodiment, a variable focus optic module comprises a housing, a lens assembly, and a protrusion and recess system. The lens assembly is movably disposed in operable relationship with the housing. The protrusion and recess system comprises at least one protrusion disposed on one of the housing and the lens assembly, and at least one recess disposed in the opposing one of the lens assembly and the housing. The at least one protrusion operatively engages the at least one recess to control axial movement of the lens assembly, in discrete steps relative to the housing.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

Figure 1:
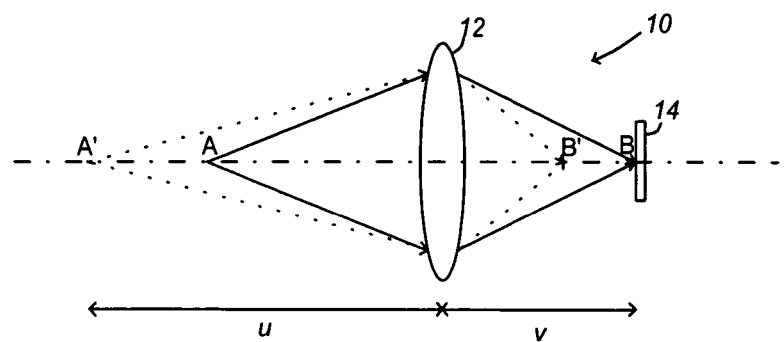
FIG. 1 is a schematic view of relative object and image distances from a lens.

FIG. 1 illustrates an optic system 10 comprising a lens 12 and image receiver 14. By way of example, the image receiver 14 could alternately take the form of a charge-coupled device (CCD) array, or film. In use, light reflected from a point A of a first image refracts through the lens 12 and is focused at a point B. Since point B coincides with the plane of the image receiver 14, the image of which point A forms a part will be reproduced in-focus at the image receiver 14. In contrast, light reflected from a point A' of a second image refracts through the lens 12 and is focused at a point B'. Since point B' fails to coincide with the plane of the image receiver 14, the image of which point A' forms a part will be reproduced out-of-focus at the image receiver 14.

If the optic system 10 is provided with a variable focusing system, the image of which point A' forms a part may be brought into focus by decreasing the distance between the lens 12 and image receiver 14. Generally, to focus an image at image receiver 14, the distance u between the image and lens 12, and the distance v between the lens 12 and image receiver 14, is governed by the following equation:

$$1/u + 1/v = 1/F$$

where F is a constant equal the focal length of the lens 12.

A variety of mechanisms to accomplish movement of lens 12 with respect to image receiver 14 are shown in FIGS. 2–7.

Figure 2:
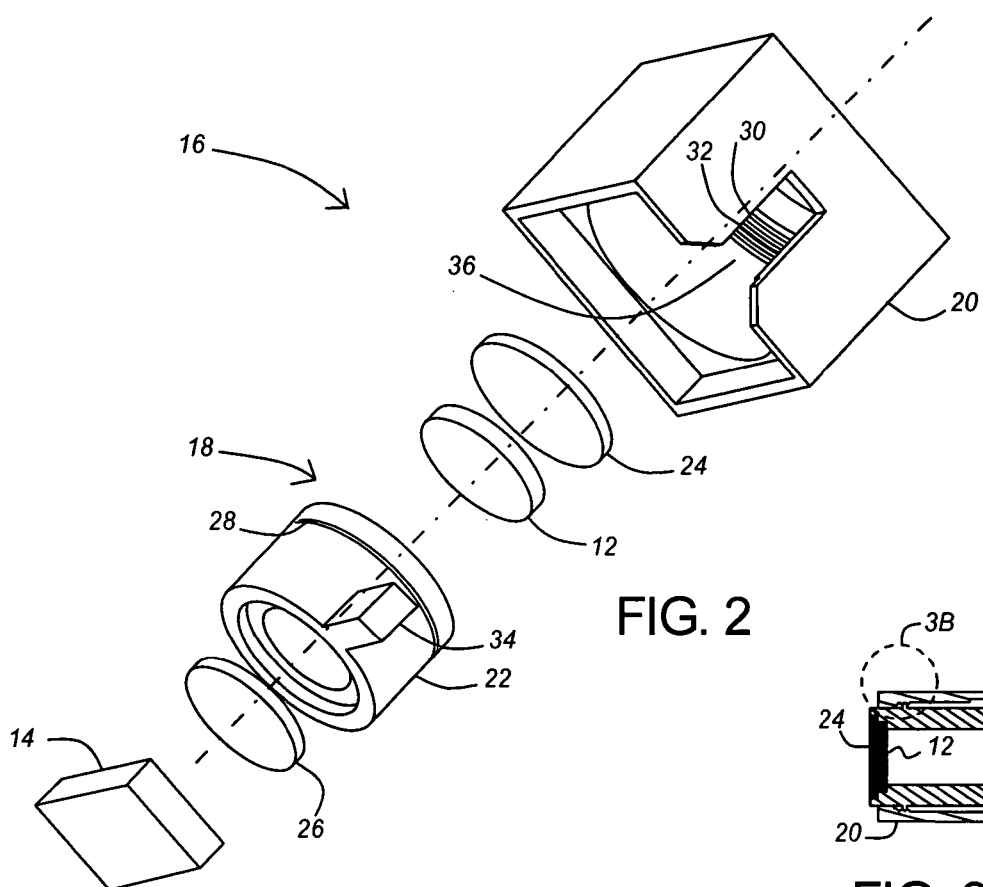
FIG. 2 is an exploded isometric view of a first variable focus optic module.

FIG. 2 illustrates an optic module 16 comprising a lens assembly 18 and a housing 20. In use, the housing 20 may be attached to (or form part of) an optic system 10 that maintains an image receiver 14 in fixed relation to the housing 20.

The lens assembly 18 may take various forms. In FIG. 2, the lens assembly comprises a barrel 22 in which lens 12 is mounted. Optionally, a protective cover 24 and infrared (IR) filter 26 may also be mounted in the barrel 22.

When assembled, the lens assembly 18 is movably disposed in operable relationship with the housing 20. For example, as shown in FIG. 2, the lens assembly 18 may be disposed substantially within the housing 20.

The optic module 16 further comprises a protrusion and recess system. The protrusion and recess system shown in FIG. 2 comprises a raised band 28 (i.e., a protrusion) formed on an outer surface of the barrel 22, and a plurality of recessed rings 30, 32 formed on an inner surface of the housing 20 (see FIGS. 3A & 3B). Alternately, the raised band could be formed on the inner surface of the housing 20, and the recessed rings could be formed on the outer surface of the barrel 22. As the lens assembly 18 is moved axially relative to the housing 20, the raised band 28 alternately engages one or the other of the recessed rings 30, 32. In this manner, the protrusion and recess system controls axial movement of the lens assembly 18, in discrete steps relative to the housing 20, thereby providing a variable focusing system that enables the selection of one of two fixed relationships between the lens 12 and the image receiver 14.

In alternate embodiments of the optic module 16, the protrusion and recess system may take any of a number of forms comprising at least one protrusion disposed on the housing 20 or lens assembly 18, and at least one recess disposed on the opposing one of the lens assembly 18 or housing 20. For example, the protrusion and recess system could comprise one band and one opposed recess, such that the lens assembly 18 is movable with respect to the housing, but only securable in one default position. In another embodiment, the protrusion and recess system could comprise one or more dimples and opposed nodules (i.e., with neither part of the system forming a ring).

Figure 3A:
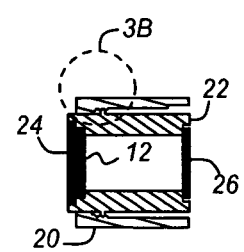
FIGS. 3A, 3B, 3C and 3D respectively provide cross-sectional elevation, exploded cross-sectional elevation, elevation and plan views of the optic module shown in FIG. 2.
Figure 3B:
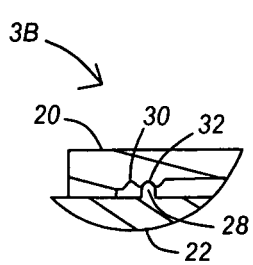
Figure 3C:
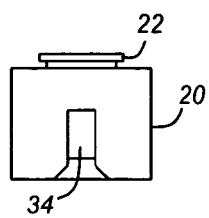
Figure 3D:
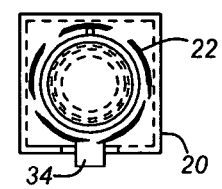

The lens assembly 18 may further comprise a manipulable projection 34 that is adapted to be engaged to move the lens assembly 18 to one of its desired positions. As shown in FIGS. 2, 3C and 3D, the manipulable projection may extend through a longitudinal slot 36 formed in the housing 20.

Figure 4:
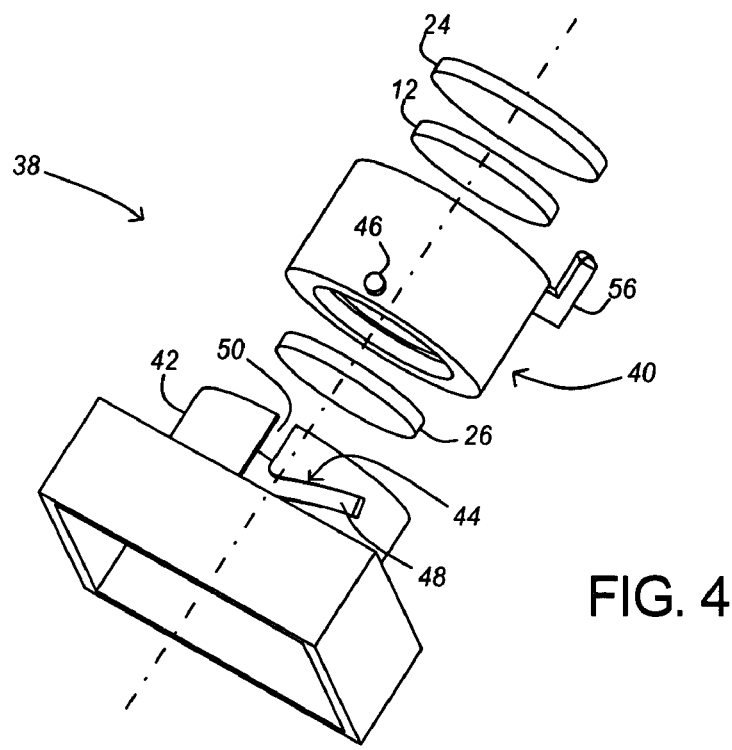
FIG. 4 is an exploded isometric view of an alternative variable focus optical module.
Figure 5:
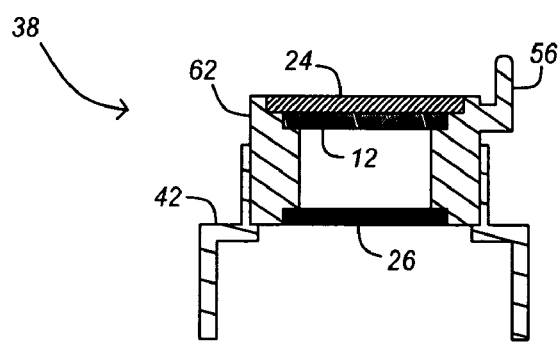
FIG. 5 provides a cross-sectional elevation of the optic module shown in FIG. 4.

FIG. 4 illustrates an alternate optic module 38. Similarly to the optic module 16, the optic module 38 comprises a lens assembly 40 and a housing 42. However, in contrast to the optic module 16, the protrusion and recess system of the optic module 38 comprises a guide track 44 (i.e., a recess) formed in the housing 42, and a protrusion 46 on the lens assembly 40 that extends into the guide track 44. The guide track 44 is provided with at least an axially spiraling portion 48 that enables the lens assembly 40 to be moved axially in a rotational manner. In this manner, the protrusion and recess system controls axial movement of the lens assembly 40 relative to the housing 42, thereby providing a variable focusing system.

The guide track 44 may be further provided with a longitudinal portion 50 that enables the lens assembly 40 to be moved in a translational manner.

A manipulable projection or handle 56 may be provided on the lens assembly 40 so as to make it easier to grasp for rotational movement.

In some embodiments (see FIG. 6), one or both walls of the guide track 44 may be provided with a corrugated portion (52 and/or 54). In this manner, the protrusion 46 that extends into the guide track 44 may be engaged by the corrugated portion(s) 52, 54 of the guide track 44 as the lens assembly 40 is rotated, thereby providing discrete focusing positions.

Figure 6:
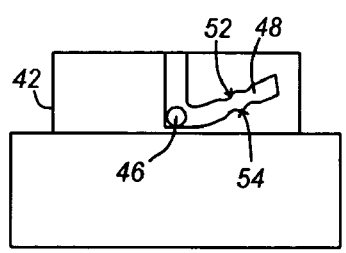
FIG. 6 shows an alternate embodiment of the guide track shown in FIG. 4.
Figure 7:
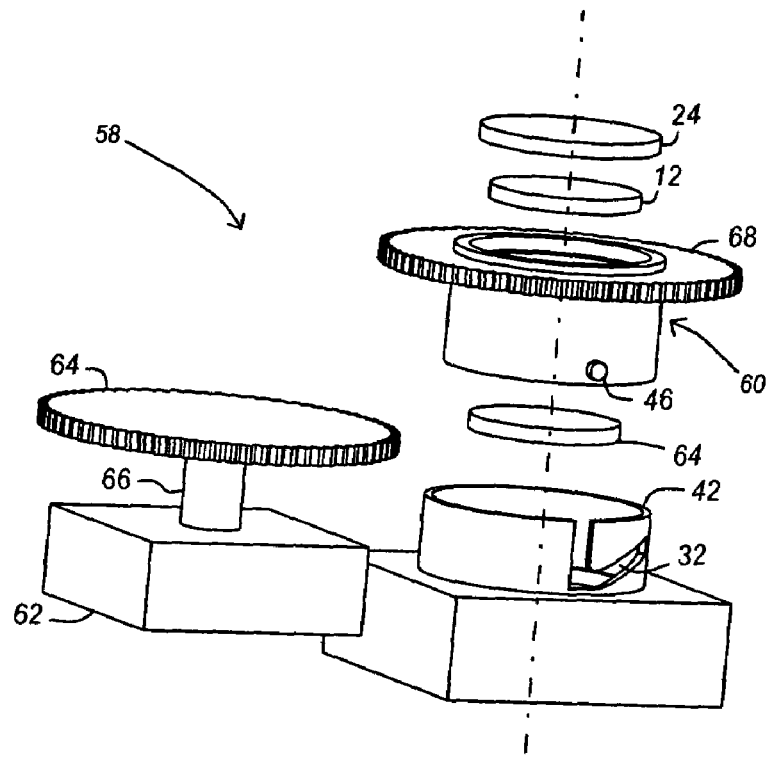
FIG. 7 is an exploded isometric view of a further alternative variable focus optic module.
Figure 8:
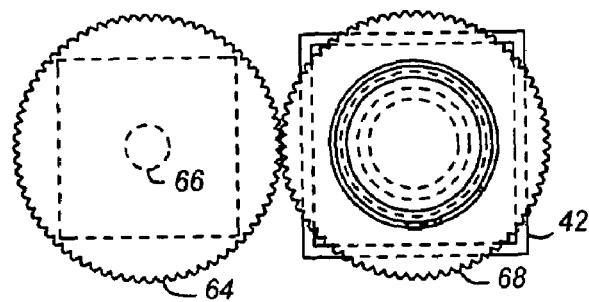
FIG. 8 provides a plan view of the optical module shown in FIG. 7.

FIGS. 6 & 7 illustrate yet another embodiment of an optic module. The optic module 58 is similar to the optic module 38, with the exception that the lens assembly 60 of the optic module 58 interfaces with a rotational motive device 62. In this manner, the motive device 62 may be controlled to automatically rotate the lens assembly 60 with respect to the housing 42. As shown, the interface between the motive device 62 and lens assembly 60 may comprise 1) a drive gear 64 attached to a spindle 66 of the motive device 62, and 2) a driven gear 68 attached to (e.g., formed with, or pressed onto) the lens assembly 60. The gears 64, 68 are then positioned to engage one another. Optionally, the gears 64, 68 need not be formed in their entirety (e.g., if guide track 44 spirals around one-quarter of the circumference of housing 42, the motive device 62 and lens assembly 60 need only be provided quarter-gears, or discs having teeth covering only one-quarter of their circumference).

In one embodiment, the motive device 62 is a stepper motor that provides discrete focusing steps.

The above-disclosed optic modules 16, 38, 58 may be coupled to (or formed as part of) a variety of optic systems, including for example, film and digital cameras. In some embodiments, the disclosed optic modules 16, 38, 58 are included in a mobile camera phone to provide a simple and low-cost variable focusing means for the phone's camera.

What is claimed is:

1. A variable focus optic module, comprising:
   a housing;
   a lens assembly, movably disposed in operable relationship with the housing; and
   a protrusion and recess system, comprising:
      at least one protrusion disposed on one of the housing and the lens assembly; and
      at least one recess disposed In the opposing one of the lens assembly and the housing, wherein the at least one protrusion operatively engages the at least one recess to control axial movement of the lens assembly, in discrete steps relative to the housing;
      wherein each of the at least one recess is a dimple, and wherein each of the at least one protrusion is a nodule.

2. A variable focus optic module, comprising:
   a housing;
   a lens assembly, movably disposed in operable relationship with the housing; and
   a protrusion and recess system, comprising:
      at least one protrusion disposed on one of the housing and the lens assembly; and
      at least one recess disposed in the opposing one of the lens assembly and the housing, each of the at least one recess including a corrugated element having alternate raised and recessed steps,
      wherein the at least one protrusion operatively engages successive corrugated elements of the respective at least one recess to control axial movement of the lens assembly substantially parallel to an optical axis, in discrete steps relative to the housing.

3. The optic module of claim 2, wherein:
   the housing has an inner surface and the at least one recess is formed in the inner surface of the housing; and
   the lens assembly has an outer surface and the at least one protrusion is formed on the outer surface of the lens assembly.

4. The optic module of claim 3, wherein:
   the lens assembly comprises a barrel, and a lens fixed in the barrel; and
   the outer surface of the lens assembly is on an outer surface of the barrel.

5. The optic module of claim 2, wherein the at least one recess comprises a recessed ring, and wherein the at least one protrusion comprises a raised band.

6. The optic module of claim 2, wherein the at least one recess comprises two or more recesses, and wherein the at least one protrusion is one protrusion.

7. The optic module of claim 2, wherein the at least one recess is one recess, and wherein the at least one protrusion comprises two or more protrusions.

8. The optic module of claim 2, wherein the lens assembly comprises a manipulable projection that is adapted to be engaged to move the lens assembly to a desired position.

9. The optic module of claim 8, wherein the housing has a longitudinal slot formed therein, through which the manipulable projection extends.

10. The optic module of claim 2, wherein the lens assembly is adapted to be moved axially, in a rotational manner.

11. The optic module of claim 2, wherein:
    the at least one recess comprises a guide track formed in the housing, the guide track having at least a helical portion; and
    at least one of the protrusions extends into the guide track, the at least one of the protrusions adapted to be engaged with the helical portion to control axial and rotational movement of the lens assembly in the discrete steps.

12. The optic module of claim 11, wherein the guide track further comprises a longitudinal portion.

13. A variable focus optic module, comprising:
    a housing;
    a lens assembly, movably disposed in operable relationship with the housing; and
    a protrusion and recess system, comprising:
       at least one protrusion disposed on one of the housing and the lens assembly; and
       a guide track formed in a body comprising an opposing one of the lens assembly and the housing, the guide track having at least a helical portion that extends helically around a portion of the body and a longitudinal portion, the helical portion configured to engage the at least one protrusion as the at least one protrusion transitions from the longitudinal portion to the helical portion, wherein the at least one protrusion selectively extends:
a) into the longitudinal portion of the guide track to control axial movement of the lens assembly relative to the housing, or
b) into the helical portion of the guide track to control axial and rotational movement of the lens assembly relative to the housing.

14. The optic module of claim 13, wherein:
at least one wall of the guide track has a corrugated portion; and
the at least one protrusion that extends into the guide track is engaged by the corrugated portion of the guide track as the lens assembly is rotated.

15. The optic module of claim 13, wherein the lens assembly has a manipulable projection connected thereto, the manipulable projection being adapted to be engaged to rotate the lens assembly with respect to the housing.

16. The optic module of claim 13, further comprising a rotational motive device that interfaces with the lens assembly to rotate the lens assembly with respect to the housing.

17. The optic module of claim 16, wherein:
the lens assembly has at least part of a driven gear attached thereto;
the rotational motive device has at least part of a drive gear attached thereto; and
the drive gear and driven gear are positioned to engage one another.

18. The optic module of claim 16, wherein the rotational motive device is a stepper motor.

19. A variable focus optic system, comprising:
a housing;
an image receiver, in a fixed position with respect to the housing;
a lens assembly, movably disposed in operable relationship with the housing and image receiver, to focus images on the image receiver; and
a protrusion and recess system, comprising;
at least one protrusion disposed on one of the housing and the lens assemblty, and
at least one recess disposed in the opposing one of the lens assembly and the housing, each of the at least one recess including a corrugated element having alternate raised and recessed steps,
wherein the at least one protrusion operatively engages successive corrugated elements of the respective at least one recess to control axial movement of the lens assembly, in discrete steps, relative to the housing and the image receiver, and
the discrete steps position the lens assembly at respective predetermined distances from the image receiver.

* * * * *

UNITED STATES PATENT AND TRADEMARK OFFICE
CERTIFICATE OF CORRECTION

| | | |
|---|---|---|
| PATENT NO. | : 7,324,290 B2 | Page 1 of 1 |
| APPLICATION NO. | : 10/939259 | |
| DATED | : January 29, 2008 | |
| INVENTOR(S) | : Chong et al. | |

It is certified that error appears in the above-identified patent and that said Letters Patent is hereby corrected as shown below:

In column 3, line 56, in Claim 1, after "disposed" delete "In" and insert -- in --, therefor.

In column 6, line 11, in Claim 19, after "comprising" delete ";" and insert -- : --, therefor.

In column 6, line 13, in Claim 19, delete "assemblty," and insert -- assembly, --, therefor.

Signed and Sealed this

Sixth Day of May, 2008

JON W. DUDAS
*Director of the United States Patent and Trademark Office*